United States Patent
Hobohm

(10) Patent No.: US 8,905,690 B2
(45) Date of Patent: Dec. 9, 2014

(54) SCEM FOR HEAT-RESISTANT MATERIALS (STAR MILL)

(75) Inventor: Uwe Hobohm, Wendelstein (DE)

(73) Assignee: Kennametal Inc., Latrobe, PA (US)

( * ) Notice: Subject to any disclaimer, the term of this patent is extended or adjusted under 35 U.S.C. 154(b) by 211 days.

(21) Appl. No.: 13/178,136

(22) Filed: Jul. 7, 2011

(65) Prior Publication Data

US 2012/0009028 A1    Jan. 12, 2012

(30) Foreign Application Priority Data

Jul. 9, 2010   (DE) .......................... 10 2010 026 784

(51) Int. Cl.
*B23C 5/10*    (2006.01)
*B23C 3/28*    (2006.01)

(52) U.S. Cl.
CPC ... *B23C 3/28* (2013.01); *B23C 5/10* (2013.01); *B23C 2210/0435* (2013.01); *B23C 2210/126* (2013.01); *B23C 2210/203* (2013.01); *B23C 2215/44* (2013.01)
USPC ................................ 409/132; 407/53; 407/56

(58) Field of Classification Search
CPC .............. B23C 5/10; B23C 2200/0466; B23C 2200/246
USPC ............. 407/30, 53, 54, 56, 63; 409/132, 131
See application file for complete search history.

(56) References Cited

U.S. PATENT DOCUMENTS

| | | | | |
|---|---|---|---|---|
| 3,701,188 | A | * | 10/1972 | Wall et al. ........................ 407/54 |
| 4,383,784 | A | * | 5/1983 | Gulbrandsen ................. 408/144 |
| 4,963,059 | A | | 10/1990 | Hiyama |
| 5,188,488 | A | * | 2/1993 | Nakayama et al. ............. 407/54 |
| 5,322,394 | A | | 6/1994 | Okanishi et al. |
| 5,609,447 | A | * | 3/1997 | Britzke et al. ................. 408/230 |
| 6,368,030 | B1 | * | 4/2002 | Sato et al. ........................ 407/53 |
| 6,910,270 | B2 | * | 6/2005 | Brock .......................... 29/889.7 |
| 6,997,651 | B2 | | 2/2006 | Kawai et al. |
| 7,959,381 | B2 | * | 6/2011 | Kienzle ........................... 407/24 |
| 2002/0031409 | A1 | * | 3/2002 | Sato et al. ........................ 407/53 |
| 2003/0202854 | A1 | * | 10/2003 | Lebkuechner ................ 409/132 |
| 2006/0045638 | A1 | * | 3/2006 | Flynn ............................... 407/53 |
| 2007/0127996 | A1 | * | 6/2007 | Heinrich et al. ............... 409/132 |
| 2011/0085862 | A1 | * | 4/2011 | Shaffer ........................... 407/54 |

FOREIGN PATENT DOCUMENTS

| | | |
|---|---|---|
| DE | 3706282 A1 | 9/1987 |
| DE | 689 15 617 T2 | 11/1994 |

(Continued)

OTHER PUBLICATIONS

German Patent and Trade Mark Office, "German Examination Report" (and English language translation thereof), dated Jun. 30, 2011, 10 total pp.

*Primary Examiner* — Daniel Howell
*Assistant Examiner* — Ryan Rufo
(74) *Attorney, Agent, or Firm* — Larry R. Meenan, Esq

(57) ABSTRACT

A milling cutter for milling a groove into a blade footing of a turbine blade made from a superalloy. The milling cutter comprises a shaft part and a cutting part connected to the shaft part in the longitudinal direction. The cutting part has flutes and, when viewed in cross section perpendicular to the longitudinal direction, has several cutting teeth distributed about the periphery. The cutting teeth are designed as scraping teeth with negative cutting geometry.

13 Claims, 1 Drawing Sheet

(56) References Cited

FOREIGN PATENT DOCUMENTS

| DE | 103 25 600 | A1 | | 1/2005 | | |
|----|---|---|---|---|---|---|
| JP | 57-156110 | A | * | 9/1982 | ............... | B23C 5/10 |
| JP | 05-277823 | A | * | 10/1993 | ............... | B23C 5/10 |
| JP | 07-088716 | | * | 4/1995 | ............... | B23C 5/10 |
| SU | 1117145 | A | * | 10/1984 | ............... | B23B 27/12 |

* cited by examiner

SCEM FOR HEAT-RESISTANT MATERIALS (STAR MILL)

BACKGROUND

1. Field of the Invention

The invention relates to a milling cutter, in particular for milling a groove into a turbine blade footing. The invention also relates to a method for milling a workpiece using such a milling cutter and to a method for producing such a milling cutter.

2. Background Information

Turbine blades for applications within the high temperature range, for example, without limitation, turbines for aeronautics or gas turbines for installations for power generation, are nowadays produced from so-called superalloys on account of the high thermal and mechanical stresses to which they are subjected. These superalloys are distinguished, as a rule, by very high strength, for example $>1000N/mm^2$, and high thermal stability. Common to the various known superalloys is the use of nickel as main component (>50% by weight) and chromium as another essential constituent. Superalloys of different manufacturers are on the market, known for example by the trade names Hastelloy, Inconel, Incoloy and Rene etc. One superalloy frequently used in aircraft power plants, power station turbines and turbo-superchargers is the superalloy with the name Rene 80, which has a nickel proportion of 60%, a chromium proportion of 14%, a cobalt proportion of 9.5% and in addition percentage proportions of titanium, molybdenum, tungsten and aluminum. The turbine blades, as a rule, are coated additionally in a ceramic manner.

Turbine blades generally consist of a blade vane and a blade footing, by way of which they are fastened on a support of the turbine. The blade footing has so-called slot-in grooves which have to be inserted during the production of the turbine blades.

To date, formation of such grooves has been effected by way of abrasive engineering as up to now no (end milling cutter) tools have been available which make machining possible and have a justifiable tool life. The term tool life refers in this case, in general, to the amount of machining time until the tool is worn. The tool life of milling tools commercially available today is only within the range of seconds or a relatively small number of minutes such that, sometimes, it is not even possible to machine one single slot-in groove in a continuous manner.

Accordingly there is room for improvement in tools and methods used for machining such superalloys.

SUMMARY OF THE INVENTION

Deficiencies in the prior art are addressed by embodiments of the present invention which make possible the machining of such superalloys that were previously only machinable with great difficulty.

As one aspect of the invention, a milling cutter is provided. The milling cutter includes a shaft part and, connecting thereto in the longitudinal direction, a cutting part, which is provided with flutes. The milling cutter is consequently designed as an end milling cutter. The shaft part is used for clamping the milling cutter in a machine tool. The cutting part—when viewed in cross section perpendicular to the longitudinal direction—has several cutting teeth distributed about the periphery. The cutting teeth are designed as scraping teeth with negative cutting edge geometry.

The term negative cutting edge geometry refers, in general, to the fact that a portion of a tooth flank of the scraping tooth, which is oriented in the cutting direction and consequently comes into engagement with the workpiece when the workpiece is being machined, assumes a negative tooth angle with reference to a radial extending through the center axis of the milling cutter. A negative tooth angle means that the tooth flank—when viewed in cross section perpendicular to the longitudinal axis—extends in an inclined manner in relation to the radial in opposition to the cutting direction. The term cutting direction refers, in general, to the tangential, that is to say the perpendicular to the radial.

By means of this special geometry, consequently, the material is scraped by the quasi forward tooth flank and not—as in the case of positive cutting edge geometry—cut into with an acute cutting wedge.

Tests have shown that when milling workpieces that consist of a superalloy, the negative cutting edge geometry makes machining possible with long tool lives. Namely, the negative cutting edge geometry and the scraping operation linked thereto clearly reduce the forces acting on the respective cutting tooth compared to positive cutting edge geometry. In addition, the cutting tooth is designed in a sturdier manner in this way.

The milling cutter, in this case, has about its periphery at least three, preferably at least four, or even more scraping teeth. In principle, the milling cutter can also be designed as a multi-point tooth with a double-digit number of scraping teeth. With regard to good smooth running, the number of scraping teeth is preferably uneven, in particular ≤5. Equally for good smooth running, unequal division is provided in an expedient manner, i.e., the angular spacing between individual scraping teeth is different.

The scraping teeth run in the radial direction outwards towards a tooth tip, which in a preferred further development is designed as a round chamfer. Consequently, the tooth does not run to a sharp tip or edge, but rather has a rounding on its radially outer periphery. This is of particular importance to the scraping operation as the cutting tooth is supported by way of the rounding on the workpiece to be machined, as a result of which the milling cutter is guided overall in an effective manner and consequently a high level of dimensional accuracy is achieved when the work piece is being machined.

In conjunction with the negative cutting edge geometry, it must be emphasized here that the entire cutting tooth does not have a sharp cutting edge but rather is formed by the tooth flank extending in an inclined manner in relation to the radial and merging into the outer radial rounding.

Consequently, during machining of the workpiece, just one tooth flank portion connecting to the round chamfer is in engagement with the workpiece to be machined, said tooth flank portion scraping the material and not cutting into the same. In this respect, the milling cutter does not have a cutting edge in the traditional sense.

According to an expedient development, the radius of the round chamfer corresponds to the radius of the cutting part. This means that the milling cutter can be produced very simply and cost-effectively. It is namely preferably provided that for producing the milling cutter, a cylindrical body with a defined radius is created first of all for forming the cutting part. An unmachined round bar is usually ground to a predefined nominal size in the region of the cutting part for this purpose. Just the flutes are then ground-in in the region of the cutting part such that the scraping teeth are formed. When grinding-in the flutes, residual portions of the outer periphery of the cylindrical body ground to nominal size remain. The residual portions form the round chamfer without having had to be ground again in a particular manner in the finishing process. Consequently, there is no additional (grinding) machining for the development of the round chamfer. Where required, the tooth flanks can be finish-machined, for example by inserting a chip-guiding step, the round chamfer, however, remains in its original state. Possible additional surface coatings or general finishing operations such as, for example, polishing remain unaffected by this.

According to an expedient development, the tooth angle between the tooth flank and the radial is within a range of between 5° and 45°, preferably within a range of between 15° and 35° and is additionally preferably at least >20°. In particular the comparatively large tooth angles >15° and in particular also >20° showed very good characteristics in the case of the superalloys that are very difficult to machine. In particular, it was shown that when machining the superalloy "Rene 80", which is usually used for turbine blades, the tooth angle >20° was shown to be excellently suitable. The tool lives of milling cutters of this type are clearly longer than those of traditional milling cutters and allow turbine blades to be machined in an economical manner, in particular for milling the so-called slot-in grooves into the blade footing.

In an expedient manner, the scraping teeth overall form a star-shaped geometry. The term star-shaped geometry, in this case, refers to the fact that the individual scraping teeth are arranged in the manner of star tips distributed about the periphery. The scraping teeth, in this case, when viewed in cross section, are in particular realized in a roughly triangular manner. The tooth flanks preferably extend in a straight line, in particular over their entire length until they butt against a tooth flank of an adjacent scraping tooth. A rounding is preferably provided in the transition region between two tooth flanks.

In a preferred development, the scraping teeth are designed in a mirror-symmetrical manner with reference to the radial. On the one hand this makes possible a simple, cost-effective production. On the other hand said symmetrical development makes it possible to use the milling cutter in both directions of rotation.

According to a preferred further development, a chip-guiding step is inserted in the tooth flank at a spacing from the round chamfer, the chip-guiding step serving for better chip removal. The chip-guiding step, in this case, is inserted in the otherwise preferably linear tooth flank in particular in the manner of an indentation or trough.

According to a preferred further development, it is also provided that a front end side of the cutting part is designed as a fillet without cutting edges. Consequently, proceeding from the radially outer tooth tips of the scraping teeth, the end face inclines inward rearwards overall such that the scraping teeth define the frontmost points of the milling cutter in the axial direction. A milling cutter of this type is very cost-effective to produce as no special cutting edges have to be inserted and provided at the end face. Using a milling cutter of this type, preferably only one radial tool machining is performed, i.e., the milling cutter is advanced exclusively in the radial or tangential direction and not in the direction of its longitudinal axis.

In further expedient developments it is provided that the flutes extend in an inclined or also helical manner. In this case, in particular, a so-called right-handed slotting is provided, i.e., in a side view of the milling cutter—proceeding from the front end face of the cutting part—the groove extends with reference to the longitudinal axis in an angularly inclined manner from left to right towards the shaft part. The effect of this right-handed slotting is that, when the workpiece is being machined, an axial force is exerted in the direction towards the shaft part such that the milling cutter is consequently pressed into the tool holding means and is not pulled out of said holding means.

In addition, in a preferred further development for improving surface quality, a coating is provided, for example a TiAlN coating such as is used in a known manner for these types of milling cutters. By means of the coating, the surface preferably has a Vickers hardness (in HV) of approximately greater than 3000. The base body of the milling cutter is preferably formed from hard metal. This geometry of the cutting part is expediently formed exclusively by grinding etc. from a hard metal round bar. As an alternative to this, it is also possible to provide cutting inserts or to design the tool as a modular tool where the cutting part is fastened releasably on a base support or even non-releasably, for example by means of soldering.

As another aspect of the invention, a method for milling a workpiece is provided. The advantages and preferred developments provided with respect to the milling cutter are to be applied analogously to the method. The milling cutter is preferably used for milling a groove in a blade footing of a turbine blade, which consists in particular of a superalloy, preferably of the material Rene 80.

In this case, the milling cutter is preferably advanced exclusively in the radial direction without an axial feed motion in the direction of its longitudinal axis being carried out.

The milling operation is preferably effected within the framework of so-called trochoidal milling. This milling method, known per se, is made up by a circular movement of the milling cutter with a linear forward movement at the same time such that, overall, a type of helical path of movement of the milling cutter is produced. The essential advantage for this milling method is that the milling cutter is only subjected to a small amount of stress, which is advantageous in particular when machining superalloys.

The feed per scraping tooth, in this case, is preferably within a range of 0.05 mm to 0.2 mm. The term feed in the radial direction per scraping tooth refers to the feed motion in the radial direction per scraping tooth for one (single) revolution of the milling cutter about its longitudinal axis. It has been possible to achieve particularly good results using this type of feed for trochoidal milling in a superalloy, in particular Rene 80.

As a further aspect of the invention, a method for producing a milling cutter is provided. The method allows a milling cutter to be produced in a simple, cost-efficient manner. In the case of this method, the individual flutes between the scraping teeth are preferably inserted in one single grinding operation (per groove) by means of a grinding wheel, the wheel profile of which corresponds to the desired groove profile.

BRIEF DESCRIPTION OF THE DRAWINGS

An exemplary embodiment of the invention is explained in more detail below by way of the figures, in part in simplified representations, in which.

Equivalent parts are provided with the identical references in the Figures.

DESCRIPTION OF AN EXEMPLARY EMBODIMENT

Figure 1:
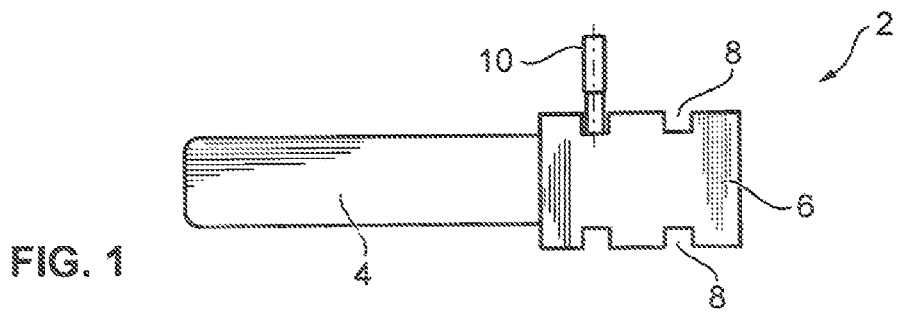
FIG. 1 shows a roughly simplified side representation of a turbine blade with a schematically indicated milling cutter in accordance with an example embodiment of the present invention to illustrate the milling operation for inserting a slot-in groove into a blade footing of the turbine blade.

FIG. 1 shows a turbine blade 2, as is used, for example, in power plants for aircraft or also for turbines, for example gas turbines, for power generation. The turbine blade 2 generally has a turbine vane 4 and a blade footing 6. The blade footing 6 usually has a substantially cuboid-shaped geometry. At least one or even several slot-in grooves 8 are usually inserted in opposite edge sides. The turbine blade 2 itself consists of a superalloy, such as, for example, the superalloy known by the trade name Rene 80. This material is barely machinable using conventional tooling. Consequently, the slot-in grooves 8 have been inserted by means of an expensive, cost-intensive grinding method.

By means of the milling cutter 10, explained in more detail in the following FIGS. 2 to 4, in particular also in combination with trochoidal milling, economic and continuous machining of the blade footing 6 for inserting the slot-in grooves 8 can now be achieved. In the case of trochoidal milling, the milling cutter is advanced in the radial direction 12 in relation to the blade footing 6. The radial direction 12 is shown in FIG. 3 and extends in FIG. 1 into the paper plane and corresponds to the longitudinal direction of the slot-in grooves 8. The entire depth of the slot-in groove 8 is created with only one milling operation, i.e., the milling cutter 10 is in engagement with the blade footing 6 over an axial length which corresponds to the depth of the groove.

The feed motion in the radial direction 12 is superposed by a circular movement of the milling cutter 10. This means that a center axis 14 of the milling cutter is moved along a circular path. This means that the groove width is greater than the diameter of the milling cutter 10. This means that, compared to an exclusive feed motion in the radial direction 12, fewer part regions of the milling cutter 10 are in engagement with the workpiece such that the milling cutter 10 overall is subject to less stress.

Through the special development of the milling cutter 10, the removal of the material is effected by a scraping process that protects the tool.

Figure 2:
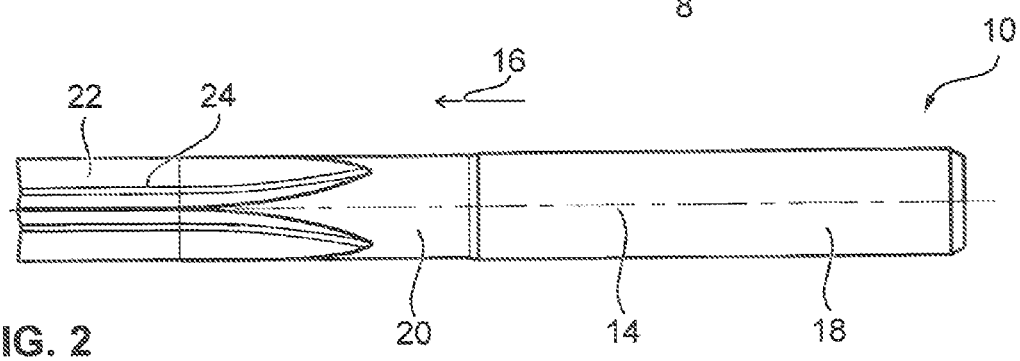
FIG. 2 shows a side representation of a milling cutter in accordance with an example embodiment of the present invention.
Figure 3:
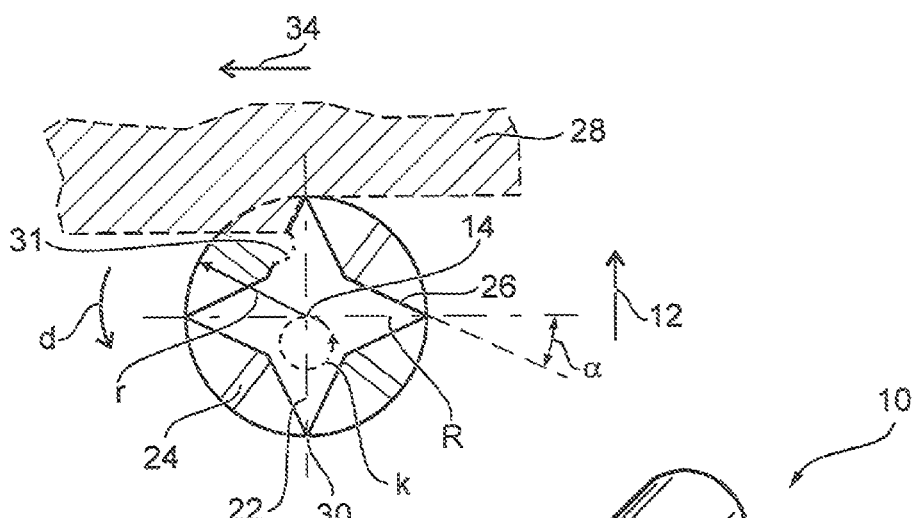
FIG. 3 shows a view onto the end side of the milling cutter in FIG. 2 in combination with a schematically indicated workpiece.
Figure 4:
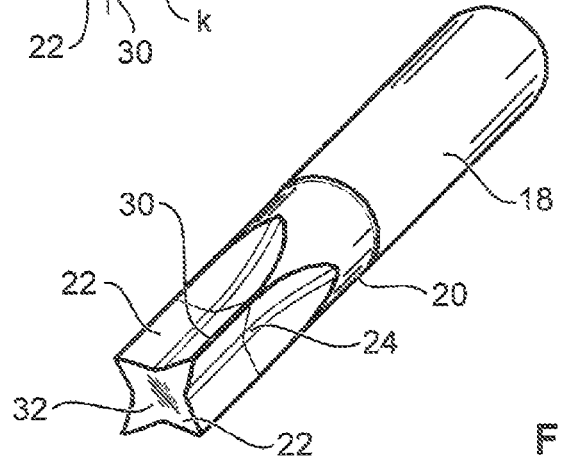
FIG. 4 shows a perspective view of the milling cutter of FIG. 2.

As can be seen from FIGS. 2 to 4, the milling cutter 10 extends along a longitudinal direction 16 and has in its rear region a shaft part 18, to which a cutting part 20 connects forwards. The cutting part 20, in the exemplary embodiment, has a star-shaped cross-sectional area (when viewed perpendicular to the longitudinal direction 16), as can be seen in particular in FIG. 3. In the exemplary embodiment, this is formed by four scraping teeth 22 arranged distributed about the periphery with flutes 24 arranged in each case between them. In the exemplary embodiment, the individual scraping teeth 22 are designed in a mirror-symmetrical manner with regard to a radial R. The individual scraping teeth 22 each have tooth flanks 26. These extend in the exemplary embodiment in a straight line, until they butt in the base of a groove against a tooth flank 26 of an adjacent scraping tooth 22. Overall this produces, in each case, a flute 24 with a groove base that extends approximately in a V-shaped manner.

Of particular importance is the negative "cutting edge geometry" of the scraping teeth 22. This is formed by a negative tooth angle α which is approximately 25° in the exemplary embodiment. The tooth angle α, in this case, defines the orientation of the tooth flank 26, which, when a workpiece 28 is being machined, is in engagement with said workpiece, in relation to the radial R, as can be seen in FIG. 3. The tooth flank 26, consequently,—with reference to the direction of rotation d—lies in front of the radial R, towards which the tooth flank 26 extends towards the tooth tip.

Another essential feature in the special geometry of the milling cutter 10 can be seen in the fact that the individual scraping teeth 22 form a round chamfer 30 at their tooth tip, that they, therefore, do not extend in a sharp-edged manner, but rather when the two tooth flanks 26 contact each other, have a rounding. The radius of the rounding, in this case, corresponds to the radius of the milling cutter 10 in the region of the cutting part 20, that is to say depending on the radius of the milling cutter, for example 5 mm-15 mm.

It is additionally provided in a modified design variant that arranged additionally in the tooth flank 26 is another chip-guiding step 31 which provides for improved chip removal. This is indicated at a scraping tooth in FIG. 3 simply as an example by means of a dotted line.

As can be seen in FIGS. 2 and 4, the milling cutter 10 has a cutting edge-free front end face 32. This is formed by a fillet such that it is ensured during the milling operation that the milling cutter 10 does not come into contact with the workpiece 28 in the region of the center axis 14, but rather in this case has free travel.

The milling operation can be represented by way of the diagram in FIG. 3 as follows: the milling cutter 10 is advanced to the workpiece 28 in the radial direction 12 corresponding to the selected feed motion. The milling cutter 10, in this case, rotates in the direction of rotation d about its center axis 14. At the same time, the feed motion and the rotational movement of the milling cutter 10 are superposed by a circular movement of its center axis 14, as is represented by the dot-dash circle k. This superposed rotational movement produces trochoidal milling where a roughly helical milling path is created and successive individual crescent-shaped chips are removed from the workpiece 28. This is effected by means of a scraping process where a front part region of the respective tooth flank 26 oriented towards the tooth tip is in engagement with the workpiece 28 with its negative tooth geometry and takes care of the material removal. The tooth flank 26, in this case, scrapes material in the cutting direction 34 on account of the rotational movement.

In the exemplary embodiment, the flutes 24 extend in a straight line and parallel to the longitudinal direction 16. As an alternative to this, the cutting part 20 is grooved in an inclined or helical manner. The cross-sectional geometry in the cutting part 20 is constant in the longitudinal direction 16 in general, preferably over the entire length as far as a rear outlet region.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A milling cutter for milling a groove into a blade footing of a turbine blade made from a superalloy, the milling cutter comprising:

a shaft part; and a cutting part connected to the shaft part in the longitudinal direction, the cutting part having flutes and, when viewed in cross section perpendicular to the longitudinal direction, has several cutting teeth distributed about the periphery, each cutting tooth being defined by a pair of tooth flanks, one tooth flank extending in a straight line from an outermost portion to a base of an adjacent cutting tooth, wherein the cutting teeth are designed as scraping teeth with negative cutting geometry, wherein each pair of tooth flanks are disposed in a mirror-symmetrical manner with regard to a radial extending from the center of the cutting part to the outermost portion of the respective cutting tooth, and wherein each tooth flank is disposed with reference to the radial at a negative tooth angle which is within the range of 15° to 35°.

2. The milling cutter as recited in claim 1, wherein the scraping teeth comprise a radially outer end having a tooth tip which is formed by a round chamfer.

3. The milling cutter as recited in claim 2, wherein the round chamfer is defined by a radius that corresponds to the radius of the cutting part.

4. The milling cutter as recited in claim 1 wherein the negative tooth angle is greater than 20°.

5. The milling cutter as recited in claim 1, wherein the cutting part, when viewed in cross section, has a star-shaped geometry, wherein the scraping teeth are disposed about the periphery of the geometry.

6. The milling cutter as recited in claim 1, wherein the cutting part has a front end face which is designed as a fillet without cutting edges, the filet being structured such that the milling cutter does not contact a workpiece in a region near the center axis of the milling cutter while performing a milling operation on the workpiece.

7. A method for milling a workpiece made from a superalloy by means of a milling cutter as recited in claim 1, which extends along a longitudinal direction, the method comprising:

moving the milling cutter in relation to the workpiece perpendicular to the longitudinal axis in a radial direction; and removing material from the workpiece via a scraping operation carried out by the scraping teeth.

8. The method as recited in claim 7, wherein the workpiece is a turbine blade with a blade footing and a groove is milled into the blade footing.

9. The method as recited in claim 7, wherein moving the milling cutter comprises a trochoidal milling operation.

10. The method as recited in claim 7, wherein in the radial direction, a feed motion is set up within the range of approximately 0.05 mm to 0.2 mm per scraping tooth.

11. A method for producing a milling cutter as recited in claim 1, wherein to form a cutting part, flutes are ground into a cylindrical body with defined radius for forming the scraping teeth in such a manner that tooth flanks of a respective scraping tooth are connected by means of a round chamfer, which is formed by a residual portion of the outer periphery of the cylindrical body.

12. A method for milling a workpiece made from a superalloy by means of a milling cutter as recited in claim 1, which extends along a longitudinal direction and has a cutting part, which, when viewed in cross section perpendicular to the longitudinal direction, has several cutting teeth designed as scraping teeth with negative cutting geometry, the method comprising:

moving the milling cutter in a trochoidal milling operation in relation to the workpiece perpendicular to the longitudinal axis in a radial direction; and removing material from the workpiece via a scraping operation carried out by the scraping teeth.

13. The milling cutter as recited in claim 1, wherein a chip-guiding step is formed in a tooth flank of the pair of tooth flanks at a spacing from the outermost portion.

* * * * *

UNITED STATES PATENT AND TRADEMARK OFFICE
CERTIFICATE OF CORRECTION

PATENT NO.        : 8,905,690 B2                                    Page 1 of 1
APPLICATION NO.   : 13/178136
DATED             : December 9, 2014
INVENTOR(S)       : Uwe Hobohm It is certified that error appears in the above-identified patent and that said Letters Patent is hereby corrected as shown below:

IN THE SPECIFICATION
In Column 2, Line 30, delete "particular ≤5." and insert -- particular ≥5 . --, therefor.

Signed and Sealed this
Fifth Day of May, 2015

Michelle K. Lee
*Director of the United States Patent and Trademark Office*